US008849657B2

(12) United States Patent
Shin

(10) Patent No.: US 8,849,657 B2
(45) Date of Patent: Sep. 30, 2014

(54) APPARATUS AND METHOD FOR ISOLATING MULTI-CHANNEL SOUND SOURCE

(75) Inventor: Ki Hoon Shin, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 257 days.

(21) Appl. No.: 13/325,417

(22) Filed: Dec. 14, 2011

(65) Prior Publication Data

US 2012/0158404 A1 Jun. 21, 2012

(30) Foreign Application Priority Data

Dec. 14, 2010 (KR) ........................ 10-2010-0127332

(51) Int. Cl.
*G10L 21/02* (2013.01)
*G10L 21/0216* (2013.01)

(52) U.S. Cl.
CPC ......... *G10L 21/0216* (2013.01); *G01L 21/0232* (2013.01)
USPC ............................ 704/226; 704/227; 704/228

(58) Field of Classification Search
USPC .................................. 704/200, 226–228, 233
See application file for complete search history.

(56) References Cited

U.S. PATENT DOCUMENTS

| | | | | |
|---|---|---|---|---|
| 8,131,542 | B2 * | 3/2012 | Nakajima et al. | 704/218 |
| 8,392,185 | B2 * | 3/2013 | Nakadai et al. | 704/233 |
| 8,548,802 | B2 * | 10/2013 | Nakadai et al. | 704/207 |
| 2006/0056647 | A1 * | 3/2006 | Ramakrishnan et al. | 381/119 |
| 2007/0133811 | A1 * | 6/2007 | Hashimoto et al. | 381/22 |
| 2008/0294430 | A1 * | 11/2008 | Ichikawa | 704/226 |
| 2009/0177468 | A1 * | 7/2009 | Yu et al. | 704/233 |
| 2010/0082340 | A1 * | 4/2010 | Nakadai et al. | 704/233 |
| 2010/0299145 | A1 * | 11/2010 | Nakadai et al. | 704/233 |
| 2012/0158404 | A1 * | 6/2012 | Shin | 704/233 |

* cited by examiner

*Primary Examiner* — Douglas Godbold
(74) *Attorney, Agent, or Firm* — Staas & Halsey LLP

(57) ABSTRACT

In an apparatus and method for isolating a multi-channel sound source, the probability of speaker presence calculated when noise of a sound source signal separated by GSS is estimated is used to calculate a gain. Thus, it is not necessary to additionally calculate the probability of speaker presence when calculating the gain, the speaker's voice signal can be easily and quickly separated from peripheral noise and reverb and distortion are minimized. As such, if several interference sound sources, each of which has directivity, and speakers are simultaneously present in a room with high reverb, a plurality of sound sources generated from several microphones can be separated from one another with low sound quality distortion, and the reverb can also be removed.

20 Claims, 6 Drawing Sheets

APPARATUS AND METHOD FOR ISOLATING MULTI-CHANNEL SOUND SOURCE

CROSS-REFERENCE TO RELATED APPLICATIONS

This application claims the benefit of Korean Patent Application No. 2010-0127332, filed on Dec. 14, 2010 in the Korean Intellectual Property Office, the disclosure of which is incorporated herein by reference.

BACKGROUND

1. Field

Embodiments relate to an apparatus and method for isolating a multi-channel sound source so as to separate each sound source from a multi-channel sound signal received at a plurality of microphones on the basis of stochastic independence of each sound source under the environment of a plurality of sound sources.

2. Description of the Related Art

Demand for technology, capable of removing a variety of peripheral noise and a voice signal of a third party from a sound signal generated when a user talks with another person in a video communication mode using a television (TV) in home or offices or talks with a robot, is rapidly increasing.

In recent times, under the environment such as Independent Component Analysis (ICA), including a plurality of sound sources, many developers or companies are conducting intensive research into a Blind Source Separation (BSS) technique capable of separating each sound source from a multi-channel signal received at a plurality of microphones on the basis of stochastic independence of each sound source.

BSS is a technology capable of separating each sound source signal from a sound signal in which several sound sources are mixed. The term "blind" indicates the absence of information about either an original sound source signal or a mixed environment.

According to Linear Mixture in which a weight is multiplied by each signal, each sound source can be separated using the ICA only. According to Convolutive Mixture in which each signal is transmitted from a corresponding sound source to a microphone through a medium such as air, it is impossible to isolate sound sources using ICA alone. In more detail, sound propagated from each sound source generates mutual interference in space when sound waves are transmitted through a medium such that a specific frequency component is amplified or attenuated. In addition, a frequency component of original sound is greatly distorted by reverb (echo) that is reflected from a wall or floor and then arrives at a microphone such that it is very difficult to recognize which frequency component present in the same time zone corresponds to which sound source. As a result, it is impossible to separate a sound source using ICA alone.

In order to obviate the above-mentioned problem, a first thesis (J.-M. Valin, j. Rouat, and F. Michaud, "Enhanced robot audition based on microphone array source separation with post-filter", IEEE International Conference on Intelligent Robots and Systems (IROS), Vol. 3, pp. 2123-2128, 2004) and a second thesis (Y. Takahashi, T. Takatani, K. Osako, H. Saruwatari, and K. Shikano, "Blind Spatial Subtraction Array for Speech Enhancement in Noisy Environment," IEEE Transactions on Audio, Speech, and Language Processing, Vol. 17, No. 4, pp. 650-664, 2009) have been proposed. Referring to the second thesis, beamforming for amplifying only sound from specific direction is applied to search for the position of the corresponding sound source, a separation filter created through ICA is initialized so that separation throughput can be maximized.

According to the first thesis, additional signal processing based on voice estimation technologies shown in the following third to fifth theses are applied to a signal separated by beamforming and geometric sound source (GSS) analysis, wherein the third thesis is I. Cohen and B. Berdugo, "Speech enhancement for non-stationary noise environments," Signal Processing, Vol. 81, No. 11, pp. 2403-2418, 2001, the fourth thesis is Y. Ephraim and D. Malah, "Speech enhancement using minimum mean-square error short-time spectral amplitude estimator," IEEE Transactions on Acoustics, Speech, and Signal Processing, Vol. ASSP-32, No. 6, pp. 1109-1121, 1984 and the fifth thesis is Y. Ephraim and D. Malah, "Speech enhancement using minimum mean-square error log-spectral amplitude estimator," IEEE Transactions on Acoustics, Speech, and Signal Processing, Vol. ASSP-33, No. 2, pp. 443-445, 1985. As such, there is proposed a higher-performance speech recognition pre-processing technology in which separation performance is improved and at the same time reverb (echo) is removed so that clarity of a voice signal of a speaker is increased as compared to the conventional art.

ICA is largely classified into Second Order ICA (SO-ICA) and Higher Order ICA (HO-ICA). According to GSS proposed in the first thesis, SO-ICA is applied to the GSS, and a separation filter is initialized using a filter coefficient beamformed to the position of each sound source such that separation performance can be optimized.

Specifically, according to the first thesis, the probability of speaker presence (called speech presence probability) is applied to a sound source signal separated by GSS so as to perform noise estimation, the probability of speaker presence is re-estimated from the estimated noise so as to calculate a gain, the calculated gain is applied to GSS so that a clear speaker voice can be separated from a microphone signal in which other interference, peripheral noise and reverb are mixed.

However, according to sound source separation technology proposed in the first thesis, the same probability value of the speaker presence is used to perform noise estimation and gain calculation when a speaker's voice is separated from the peripheral noise and reverb from multi-channel sound source, and the probability of speaker presence is additionally calculated during noise estimation and gain calculation, so that a large number of calculations and serious sound quality distortion unavoidably occur.

SUMMARY

Therefore, it is an aspect to provide an apparatus for isolating a multi-channel sound source and a method for controlling the same, which can reduce the number of calculations when a speaker voice signal is separated from peripheral noise and reverb and can minimize distortion generated when the sound source is separated.

Additional aspects will be set forth in part in the description which follows and, in part, will be obvious from the description, or may be learned by practice of the invention.

In accordance with one aspect, an apparatus for isolating a multi-channel sound source may include a microphone array including a plurality of microphones; a signal processor to perform Discrete Fourier Transform (DFT) on signals received from the microphone array, convert the DFT result into a signal of a time-frequency bin, and independently separate the converted result into a signal corresponding to the number of sound sources by a Geometric Source Separation (GSS) algorithm; and a post-processor to estimate noise from a signal separated by the signal processor, calculate a gain value related to speech presence probability upon receiving the estimated noise, and apply the calculated gain value to a signal separated by the signal processor, thereby separating a speech signal, wherein the post-processor may calculate the gain value on the basis of the calculated speech presence probability and the estimated noise when noise estimation is performed at each time-frequency bin.

The post-processor may include a noise estimation unit to estimate interference leakage noise variance and stationary noise variance on the basis of the signal separated by the signal processor, and calculate speech presence probability of speech presence; a gain calculator to receive the sum $\lambda_m(k,l)$ of leakage noise variance estimated by the noise estimation unit and stationary noise variance, receive the estimated speech presence probability p'(k,l) of the corresponding time-frequency bin, and calculate a gain value G(k,l) on the basis of the received values; and a gain application unit to multiply the calculated gain G(k,l) by the signal $Y_m(k,l)$ separated by the signal processor, and generate a speech signal from which noise is removed.

The noise estimation unit may calculate the interference leakage noise variance using the following equations 1 and 2:

$$\lambda_m^{leak}(k,l) = \eta \sum_{\substack{i=1 \\ i \neq m}}^{M} Z_i(k,l) \quad \text{Equation 1}$$

$$Z_m(k,l) = \alpha_s Z_m(k,l-1) + (1-\alpha_s)|Y_m(k,l)|^2 \quad \text{Equation 2}$$

wherein, Zm(k,l) is a value obtained when a square of a magnitude of the signal $Y_m(k,l)$ separated by the GSS algorithm is smoothed in a time bin, $\alpha_s$ is a constant, and $\eta$ is a constant.

The noise estimation unit may determine whether a main component of each time-frequency bin is noise or a speech signal by applying a Minima Controlled Recursive Average (MCRA) method to the stationary noise variance, calculates speech presence probability p'(k,l) at each bin according to the determined result, and estimates noise variance of the corresponding bin on the basis of the calculated speech presence probability p'(k,l).

The noise estimation unit may calculate the speech presence probability p'(k,l) using the following equation 3:

$$p'(k,l) = \alpha_p p'(k,l-1) + (1-\alpha_p) I(k,l) \quad \text{Equation 3}$$

wherein $\alpha_p$ is a smoothing parameter of 0 to 1, and I(k,l) is an indicator function indicating the presence or absence of a speech signal.

The gain calculator may calculate a posterior SNR $\gamma(k,l)$ using the sum $\lambda_m(k,l)$ of the estimated leakage noise variance and the stationary noise variance, and calculate a prior SNR $\xi(k,l)$ on the basis of the calculated posterior SNR $\gamma(k,l)$.

The posterior SNR $\gamma(k,l)$ may be calculated by the following equation 4, and the prior SNR $\xi(k,l)$ may be calculated by the following equations 5:

$$\gamma(k,l) = \frac{|Y_m(k,l)|^2}{\lambda_m(k,l)} \quad \text{Equation 4}$$

$$\xi(k,l) = \alpha G_{H_1}^2(k,l-1)\gamma(k,l-1) + (1-\alpha)\max\{\gamma(k,l)-1, 0\} \quad \text{Equation 5}$$

wherein $\alpha$ is a weight of 0 to 1, and $G_{H_1}(k,l)$ is a conditional gain on the assumption that a speech signal is present in the corresponding bin.

In accordance with another aspect, a method for isolating a multi-channel sound source may include performing Discrete Fourier Transform (DFT) on signals received from a microphone array including a plurality of microphones; independently separating, by a signal processor, each signal converted by the signal processor into another signal corresponding to the number of sound sources using a Geometric Source Separation (GSS) algorithm; calculating, by a post-processor, speech presence probability so as to estimate noise on the basis of each signal separated by the signal processor; estimating, by the post processor, noise according to the calculated speech presence probability; and calculating, by the post processor, a gain of the speech presence probability on the basis of the estimated noise and the calculated speech presence probability at each time-frequency bin.

The noise estimation may simultaneously estimate interference leakage noise variance and stationary noise variance on the basis of the signals separated by the signal processor.

The calculation of the speech presence probability may calculate not only the sum of the calculated interference leakage noise variance and the stationary noise variance, but also the speech presence probability.

The gain calculation may calculate a posterior SNR using a posterior SNR method that receives a square of a magnitude of the signal separated by the signal processor and the estimated sum noise variance as input signals, calculate a prior SNR using a prior SNR method that receives the calculated posterior SNR as an input signal, and calculate a gain value on the basis of the calculated prior SNR and the calculated speech presence probability.

The apparatus may further multiply the calculated gain by the signal separated by the signal processor so as to isolate a speech signal.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
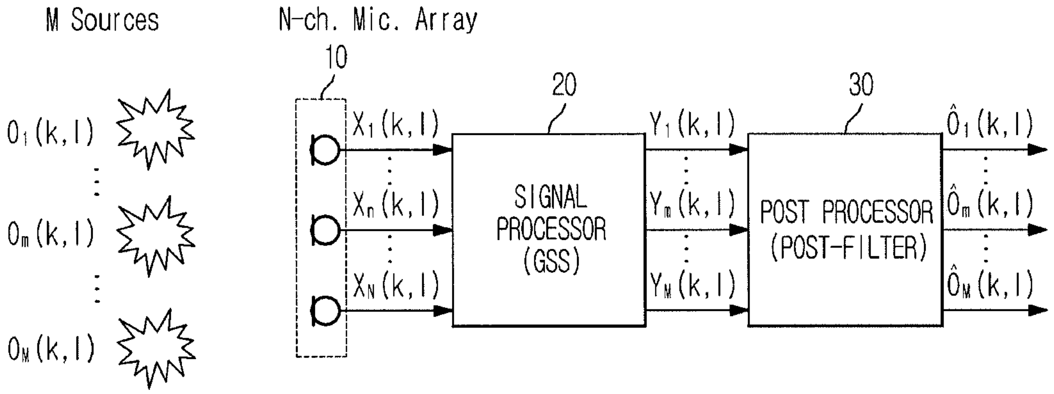
FIG. 1 is a configuration diagram illustrating an apparatus for isolating a multi-channel sound source according to one embodiment.

Reference will now be made in detail to the embodiments, examples of which are illustrated in the accompanying drawings, wherein like reference numerals refer to like elements throughout.

FIG. 1 is a configuration diagram illustrating an apparatus for isolating a multi-channel sound source according to one embodiment of the present invention.

Referring to FIG. 1, the apparatus for isolating a multi-channel sound source may include a microphone array having a plurality of microphones 10, a signal processor 20 for processing signals using Geometric Source Separation (GSS), and a post-processor 30 having a multi-channel post-filter.

In the apparatus for isolating a multi-channel sound source, the signal processor 20 may divide a signal received at the microphone array 10 composed of N microphones into several frames each having a predetermined size through the microphone array 10, apply a Discrete Fourier Transform (DFT) to each frame so as to change a current region to a time-frequency bin, and to change the resultant signal into M independent signals using the GSS algorithm.

In this case, the GSS algorithm has been disclosed in the following sixth thesis, L. C. Parra and C. V. Alvino, "Geometric source separation: Merging convolutive source separation with geometric beamforming," IEEE Transactions on Speech and Audio Processing, Vol. 10, No. 6, pp. 352-362, 2002, well known to those skilled art, and as such a detailed description thereof will be omitted herein for convenience of description.

The apparatus for isolating a multi-channel sound source can calculate estimation values of the M sound sources by applying the probability-based speech recognition technology shown in the aforementioned third and fourth theses to a signal separated by the signal processor of the post-processor, where M≤N. All variables shown in FIG. 1 include a DFT, a frequency index k, and a frame index I indicating time.

Figure 2:
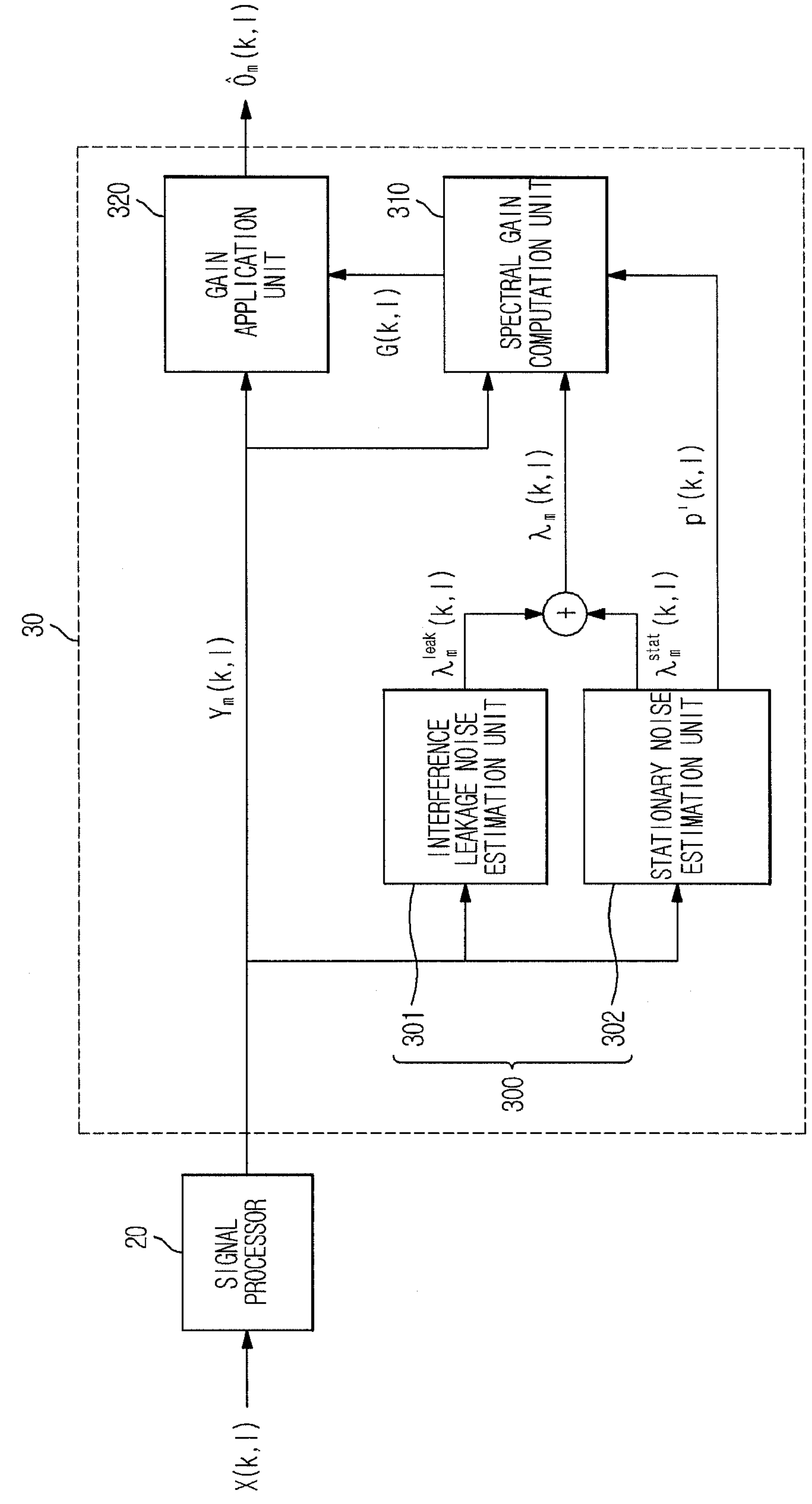
FIG. 2 is a block diagram illustrating a post-processor of the apparatus for isolating a multi-channel sound source according to one embodiment.

FIG. 2 is a block diagram illustrating a post-processor of the apparatus for isolating a multi-channel sound source according to one embodiment.

Referring to FIG. 2, the post processor 30 for applying the speech estimation technology to the signal separated by the GSS algorithm may include a noise estimator 300 to estimate noise from the signal separated by the signal processor 20; a spectral gain computation unit 310 to calculate a gain upon receiving not only noise estimated by the noise estimator 300 but also the speech presence probability used for noise estimation; and a gain application unit 320 to output a clear speech signal having no noise and no reverb by applying the calculated gain to the signal separated by the GSS algorithm.

The noise estimator 300 may assume that another sound source signal mixed with the m-th separated signal $Y_m(k,l)$ is a leaked noise, and may be divided into one part for estimating variance of the noise and another part for estimating variance of stationary noise such as airconditioner or background noise. In this case, although the post filter may be configured in the form of a Multiple Input Multiple Output (MIMO) system as shown in FIG. 1, FIG. 2 shows only the signal processing of the m-th separated signal for convenience of description and better understanding of the present invention.

For these operations, the noise estimator 300 may include an interference leakage noise estimation unit 301 and a stationary noise estimation unit 302.

The interference leakage noise estimation unit 301 may assume that another sound source signal mixed in the separation signal $Y_m(k,l)$ output from the signal processor is leaked noise, such that noise variance can be estimated.

The stationary noise estimation unit 302 may estimate variance of stationary noise such as airconditioner or background noise.

Figure 3:
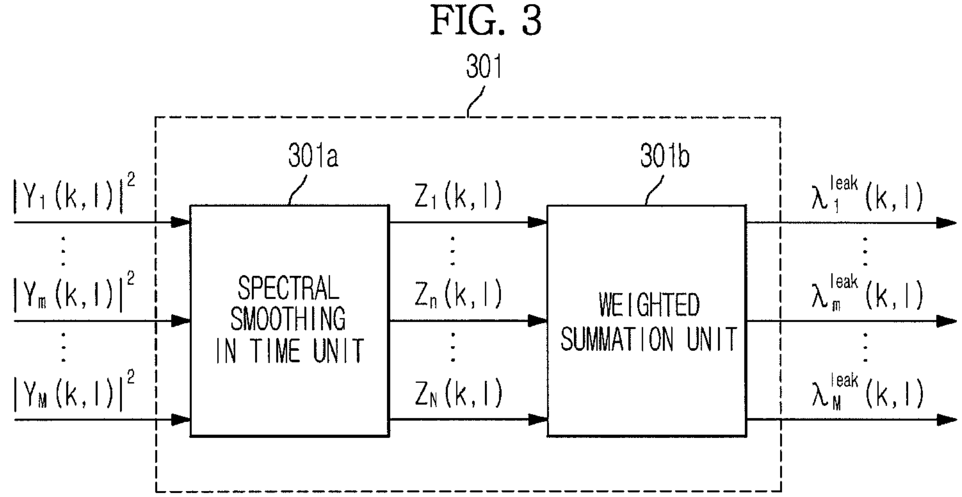
FIG. 3 is a control block diagram illustrating an interference leakage noise estimation unit contained in a post-processor of the apparatus for isolating the multi-channel sound source according to one embodiment.
Figure 4:
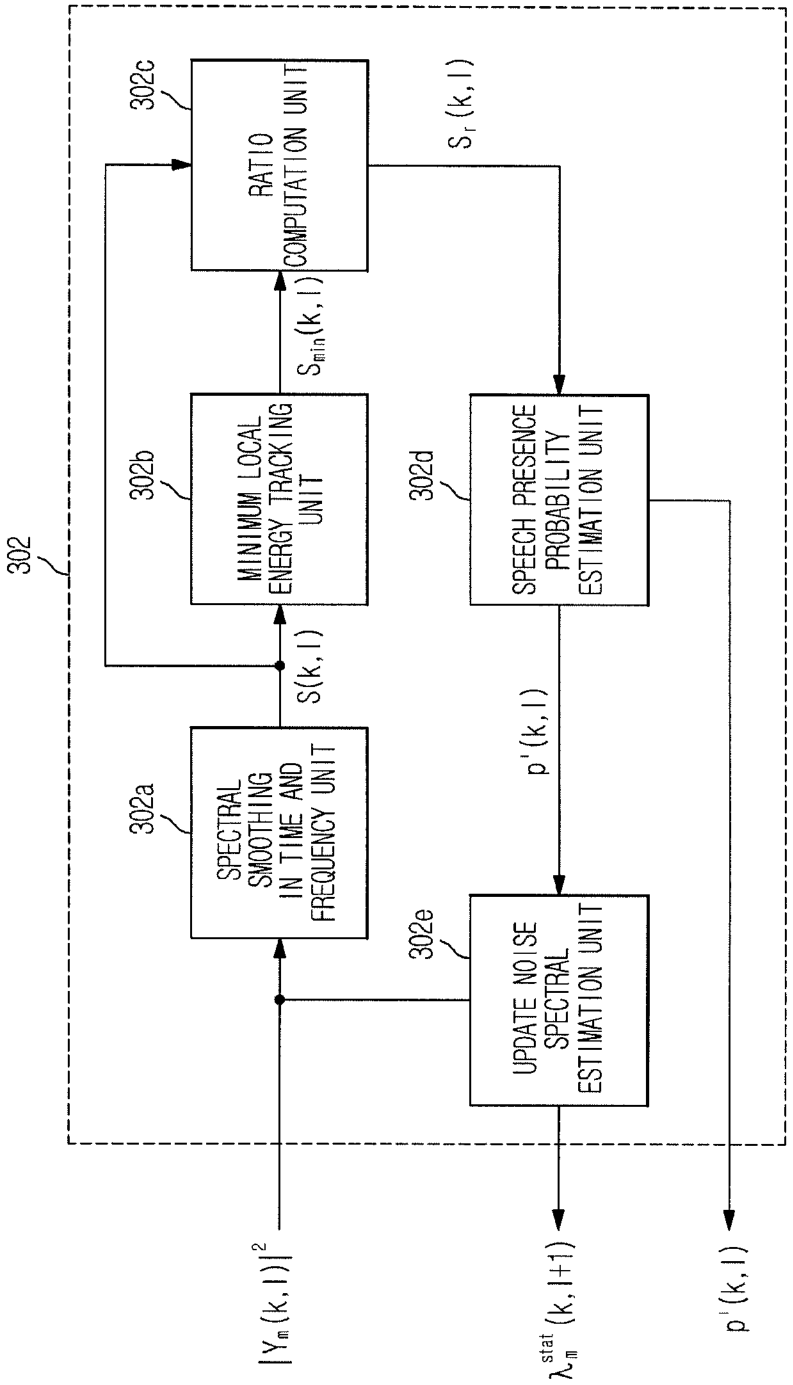
FIG. 4 is a control block diagram illustrating a stationary noise estimation unit of the post-processor of the apparatus for isolating a multi-channel sound source according to one embodiment.

FIG. 3 is a control block diagram illustrating the interference leakage noise estimation unit contained in the post-processor of the apparatus for isolating the multi-channel sound source according to one embodiment. FIG. 4 is a control block diagram illustrating the stationary noise estimation unit of the post-processor of the apparatus for isolating a multi-channel sound source according to one embodiment.

Referring to FIGS. 2 and 3, after two noise variances are estimated at each time-frequency bin using the signal separated by the GSS algorithm of the signal processor 20, the total noise variance may be applied to the spectral gain computation unit 310.

In this case, it may be impossible to completely separate a signal, so that the other sound source signal and reverb are uniformly mixed in each separation signal.

It may be difficult to completely separate the other sound source signal from the separated signal, so that the other sound source signal is defined as noise leaked from another sound source. The leaked noise variance may be estimated from the square of a magnitude of the separated signal as shown in FIG. 3, and a detailed description thereof will hereinafter be described in detail.

The estimation of stationary noise variance may determine whether a main component of each time-frequency bin is noise or a speech signal using a Minima Controlled Recursive Average (MCRA) technique proposed in the thesis I. Cohen and B. Berdugo, "Speech enhancement for non-stationary noise environments," Signal Processing, Vol. 81, No. 11, pp. 2403-2418, 2001, so that the speech presence probability p'(k,l) at each bin may be calculated, and may estimate noise variance of the corresponding time-frequency bin on the basis of the calculated speech presence probability p'(k,l).

The detailed flow of the above-mentioned description is shown in FIG. 4, and a detailed description thereof will hereinafter be described in detail.

Noise variation estimated by the noise estimation process shown in FIGS. 3 and 4 may be input to the spectral gain computation unit 310.

The spectral gain computation unit 310 may search for a time-frequency bin in which the speaker mainly exists according to not only the noise variance estimated by the noise estimation unit and the speech presence probability p'(k,l), and may calculate a gain G(k,l) to be applied to the time-frequency bin.

In this case, according to the related art, a high gain must be applied to a time-frequency bin in which information of the speaker serves as a main component, and a low gain must be applied to a bin in which noise serves as a main component, so that the related art has to additionally calculate the speech presence probability p'(k,l) at each time-frequency bin in the same manner as in the aforementioned noise estimation process. In contrast, one embodiment does not require separate calculation of the speech presence probability, and may be configured to receive the speech presence probability p'(k,l) calculated to estimate noise variation, so that the additional calculation process need not be used in the present invention.

For reference, according to the related art, the noise estimation process and the gain calculation process obtain different probability values p(k,l) and p'(k,l) whereas the probability values p(k,l) and p'(k,l) have the same meaning, because an error that the speaker present in an arbitrary bin is wrongly determined to be absent from the arbitrary bin is considered to be worse than another error caused by the noise estimation process.

As such, the hypothesis for assuming the presence of the speaker (or speech presence) so as to calculate a gain in association with a given input signal Y shown in the following equation 1 may be established to be slightly higher than the other hypothesis for assuming the presence of the speaker so as to estimate noise in association with the input signal Y, as denoted by the following equation 1.

$$P(H_1(k,l)|Y(k,l)) \geq P(H_1'(k,l)|Y(k,l)) \quad \text{Equation 1}$$

In Equation 1, $H_1(k,l)$ indicates the hypothesis for assuming that the speaker is present in a bin of the k-th frequency and the l-th frame, but it should be noted that the hypothesis $H_1(k,l)$ is adapted only for speaker estimation. $H_1'(k,l)$ indicates the hypothesis assuming that the speaker is present in the same bin as the above, and it should be noted that this hypothesis is adapted only for noise estimation.

The conditional probability of the above-mentioned equation n1 may be set to the speech presence probabilities used in the noise estimator 300 and the spectral gain computation unit 310, wherein the speech presence probability used in the noise estimator 300 and the other speech presence probability used in the spectral gain computation unit 310 are represented by the following equation 2.

$$p(k,l) \approx P(H_1(k,l)|Y(k,l))$$

$$p'(k,l) \approx P(H_1'(k,l)|Y(k,l) \quad \text{Equation 2}$$

If the speech presence probability is estimated, a gain value to be applied to each time-frequency bin may be calculated on the basis of the estimated speech presence probability, one of a first MMSE (Minimum Mean-Square Error) technique (See the fourth thesis) of the spectral amplitude and a second MMSE technique (See the fifth thesis) of a log-spectral amplitude may be selected and used.

As described above, in the conventional sound source separation technology the speech presence probability must be completely calculated in each of the noise estimation process and the gain calculation process, so that the conventional sound source separation technology has a disadvantage in that a large number of calculations is needed and the sound quality of the separated signal is seriously distorted.

The sound source separation operation of the multi-channel sound source separation apparatus according to embodiments will hereinafter be described with reference to FIGS. 1 to 4.

Many entities are conducting intensive research into a developed robot throughout the world. However, a great deal of research is focused only upon research and development instead of commercialization, such that robot technology tends to focus upon performance rather than cost. As such, although the large number of calculations occurs, a high-priced CPU and a DSP board are used to perform such calculation.

With the widespread use of IPTVs supporting the Internet, the demand of users for a video communication function over the Internet or Voice of Customer (VOC) of TVs supporting a speech recognition function used as a substitute for a conventional remote-controller is gradually increasing, so that it is necessary to intensively develop and research speech pre-processing technology. In more detail, it is necessary to continuously reduce production costs of TVs so as to increase customer satisfaction, so that it is very difficult for the manufacturer of the TVs to mount high-priced electronic components to TVs.

In addition, if sound quality of the separated speech signal is seriously distorted, such distortion may disturb a long-time phone call of the user, so that there is needed a technology for reducing the distortion degree and increasing separation performance.

Therefore, the apparatus for isolating the multi-channel sound source provides a new technique capable of minimizing not only the number of calculations of a method for isolating a speaker's voice (i.e., a speech signal) having a specific direction from peripheral noise and reverb, but also the sound quality distortion of the speech signal.

One aspect of the apparatus for isolating a multi-channel sound source according to one embodiment is to minimize not only the number of calculations requisite for the post-processor but also sound quality distortion.

The apparatus for isolating sound source according to one embodiment may use the GSS technique which initializes a separation filter formed by an ICA including SO-ICA and HO-ICA to a filter coefficient beamformed to the direction of each sound source and optimizes the initialized result.

The speech estimation technologies disclosed in the aforementioned first, third, fourth and fifth theses calculate noise variation by estimating the speech presence probability p'(k,l) obtained form the noise estimation process of FIG. 4, estimate the speech presence probability p(k,l) for speech estimation during the gain calculation process, and apply the estimated result to the gain calculation.

In this case, the speech presence probability p(k,l) obtained from the gain calculation process can be calculated on the basis of the gain G(k,l) to be applied to each time-frequency bin by the gain estimation process disclosed in the third to fifth theses. However, the above-mentioned operation has a disadvantage in that the number of calculations required for the gain calculation process is excessively increased.

Therefore, in order to perform gain calculation, the apparatus for isolating a multi-channel sound source according to one embodiment can remove the peripheral noise and reverb through the gain estimation process proposed in the third to fifth theses using the speech presence probability p'(k,l) calculated in the noise estimation process.

The noise estimation process shown in FIGS. 3 and 4 will hereinafter be described in detail.

Referring to FIG. 3, the interference leakage noise estimation unit 301 may include a Spectral Smoothing in Time Unit 301*a* and a Weighted Summation Unit 301*b*.

Assuming that the m-th separated signal $Y_m(k,l)$ is the speaker's voice signal (i.e., the speech signal), the interference leakage noise estimation unit 301 may calculate the square of a magnitude of each signal so as to estimate the leakage noise variance $\lambda_m^{leak}(k,l)$ caused by another sound source signal mixed with the speech signal, and may smooth the resultant value in the time domain as shown in the following equation 3.

$$Z_m(k,l) = \alpha_s Z_m(k,l-1) + (1-\alpha_s)|Y_m(k,l)|^2 \quad \text{Equation 3}$$

In addition, it may be assumed that a signal level of another sound source mixed with the separated signal is less than that of an original signal because of incomplete separation of the sound source by the GSS algorithm for use in the weighted summation unit 301*b*, and a constant (or invariable number) less than 1 is multiplied by the sum of the remaining separated signals other than $Y_m(k,l)$ so that the leakage noise variance $\lambda_m^{leak}(k,l)$ can be calculated using the following equation 4.

$$\lambda_m^{leak}(k,l) = \eta \sum_{\substack{i=1 \\ i \neq m}}^{M} Z_i(k,l) \quad \text{Equation 4}$$

In Equation 4, $\eta$ may be in the range from −10 dB to −5 dB. Provided that the m-th separated signal $Y_m(k,l)$ includes a desired speaker voice signal (desired speech signal) and considerable reverb, this means that similar reverb may be mixed with the remaining separated signals. In the case of calculating $\lambda_m^{leak}(k,l)$ using the above-mentioned method, reverb mixed with the speech signal is also contained in the calculated result, the spectral gain computation unit may apply a low gain to a bin having considerable reverb so that it is possible to remove the reverb along with the peripheral noise from a target signal.

In the meantime, the stationary noise variance $\lambda_m^{stat}(k,l)$ may be calculated using the Minima Controlled Recursive Average (MCRA) method (See FIG. 4).

Referring to FIG. 4, the stationary noise estimation unit 302 may include a Spectral Smoothing in Time and Frequency Unit 302*a*, a Minimum Local Energy Tracking Unit 302*b*, a Ratio Computation Unit 302*c*, a Speech Presence Probability Estimation Unit 302*d*, and an Update Noise Spectral Estimation Unit 302*e*.

Referring to the operation of the stationary noise estimation unit 302, the square of a magnitude of the separated signal may be smoothed in the frequency and time domains through the Spectral Smoothing in Time and Frequency Unit 302*a*, so that the local energy S(k,l) can be calculated at each time-frequency bin as shown in the following equation 5.

$$S_f(k,l) = \sum_{i=-w}^{w} b(i)|Y_m(k-i,l)|^2 \quad \text{Equation 5}$$

$$S(k,l) = \alpha_s S(k,l-1) + (1-\alpha_s) S_f(k,l)$$

In Equation 5, b is a window function of the length (2w+1), and $\alpha_s$ is in the range from 0 to 1.

In addition, the minimum local energy $S_{min}(k,l)$ of the signal for the next noise estimation and the temporary local energy $S_{tmp}(k,l)$ may be initialized to a first start frame value S(k,0) for each frequency by the minimum local energy tracking unit 302*b*, so that the time-variant $S_{min}(k,l)$ can be updated as shown in the following equation 6.

$$S_{min}(k,l) = \min\{S_{min}(k,l-1), S(k,l)\}$$

$$S_{tmp}(k,l) = \min\{S_{tmp}(k,l-1), S(k,l)\} \quad \text{Equation 6}$$

The minimum local energy and the temporary local energy may be re-initialized at every L frames as shown in the following equation 7, and the other minimum local energy of a frame subsequent to the L frames may be be calculated using the following equation 7.

$$S_{min}(k,l) = \min\{S_{tmp}(k,l-1), S(k,l)\}$$

$$S_{tmp}(k,l) = S(k,l) \quad \text{Equation 7}$$

In other words, L is a resolution of minimum local energy estimation of a signal. If a speech signal is mixed with noise and L is set to 0.5 to 1.5 seconds, minimum local energy is not greatly deflected along the speech level of the speech interval, and tracks a changing noise level even in another interval having the increasing noise.

Thereafter, the ratio computation unit 302 may calculate the energy ratio (shown in the following equation 8) obtained when the local energy is divided by the minimum local energy at each time-frequency bin.

In addition, if the energy ratio is higher than a specific value, the hypothesis $H_1'(k,l)$ of assuming that the speech signal is present in the corresponding bin is verified. If the energy ratio is less than the specific value, the other hypothesis $H_0'(k,l)$ of assuming that the speech signal is not present in the corresponding bin is verified. As such, the speech presence probability estimation unit 302 may calculate the speech presence probability p'(k,l) using the following equation 9.

$$S_r(k,l) = S(k,l)/S_{min}(k,l) \quad \text{Equation 8}$$

$$p'(k,l) = \alpha_p p'(k,l-1) + (1-\alpha_p) I(k,l) \quad \text{Equation 9}$$

In Equations 8 and 9, $\alpha_p$ is a smoothing parameter having the range of 0 to 1, and I(k,l) is an indicator function for determining the presence or absence of the speech signal. I(k,l) can be represented by the following equation 10.

$$I(k,l) = \begin{cases} 1, & \text{if } S_r(k,l) > \delta \\ 0, & \text{otherwise} \end{cases} \quad \text{Equation 10}$$

In Equation 10, $\delta$ is a constant decided through experimentation. For example, if $\delta$ is set to 5, a bin in which local energy is at least five times the minimum local energy is considered to be a bin having numerous speech signals.

Thereafter, the speech presence probability p'(k,l) may be calculated by equation 9 is substituted into the following equation 11 by the update noise spectral estimation unit 302*e*, so that stationary noise $\lambda_m^{stat}(k,l)$ can be recursively calculated. In this case, as can be seen from Equation 11, if a speech signal is present in a previous frame, noise variance of the current frame is maintained to be similar with that of the previous frame. If a speech signal is not present in the previous frame, the previous frame value may be smoothed using the square of a magnitude of the separated signal, and the smoothed result may be reflected into a current value.

$$\lambda_m^{stat}(k,l+1) = \lambda_m^{stat}(k,l) p'(k,l) + [\alpha_d \lambda_m^{stat}(k,l) + (1-\alpha_d) |Y_m(k,l)|^2](1-p'(k,l)) \quad \text{Equation 11}$$

In Equation 11, $\alpha_d$ is a smoothing parameter of 0 to 1.

Figure 5:
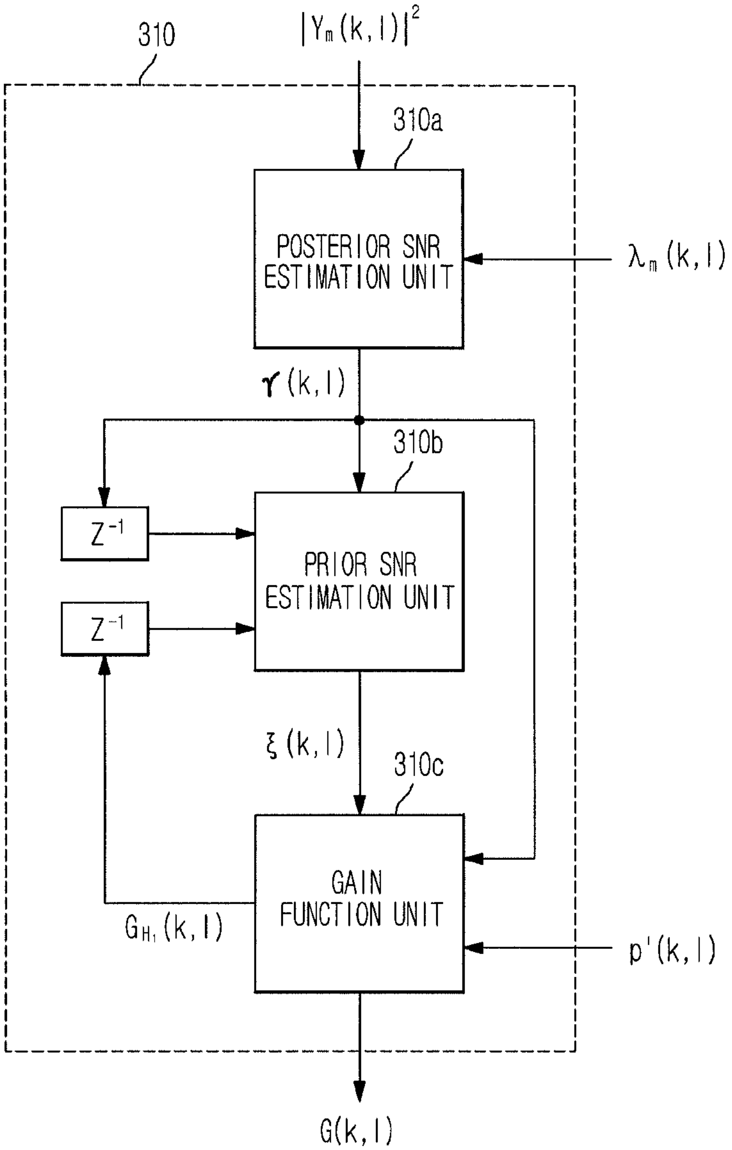
FIG. 5 is a control block diagram illustrating a spectral gain computation unit contained in the post-processor of the apparatus for isolating a multi-channel sound source according to one embodiment.
Figure 6:
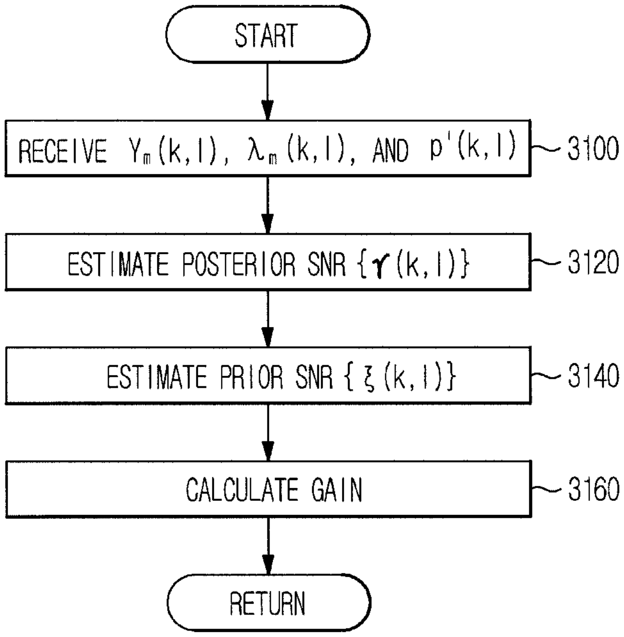
FIG. 6 is a flowchart illustrating a spectral gain computation unit contained in the post-processor of the apparatus for isolating a multi-channel sound source according to one embodiment.

FIG. 5 is a control block diagram illustrating a spectral gain computation unit contained in the post-processor of the apparatus for isolating a multi-channel sound source according to one embodiment. FIG. 6 is a flowchart illustrating a spectral gain computation unit contained in the post-processor of the apparatus for isolating a multi-channel sound source according to one embodiment.

Referring to FIG. 5, the spectral gain computation unit 310 may include a Posterior SNR Estimation Unit 310*a*, a Prior SNR Estimation Unit 310*b*, and a Gain Function Unit 310*c*. In this case, SNR is an abbreviation of "Signal to Noise Ratio".

The spectral gain computation unit 310 may receive total noise variance $\lambda_m(k,l)$ mixed with the m-th separated signal obtained by the sum of two noise variances calculated by the noise estimation unit 300, calculate a posterior SNR $\gamma(k,l)$ substituting the total noise variance $\lambda_m(k,l)$ into the following equation 12 using the posterior SNR estimation unit 310*a*, and can estimate a prior SNR $\xi(k,l)$ through the prior SNR estimation unit 310*b* using the following equation 13.

$$\gamma(k,l) = \frac{|Y_m(k,l)|^2}{\lambda_m(k,l)} \quad \text{Equation 12}$$

$$\xi(k,l) = \alpha G_{H_1}^2(k,l-1)\gamma(k,l-1) + (1-\alpha)\max\{\gamma(k,l)-1,0\} \quad \text{Equation 13}$$

In Equations 12 and 13, $\alpha$ is a weight of 0 to 1, and $G_{H_1}(k,l)$ is a conditional gain calculated on the assumption that a speech signal is present in the corresponding bin. In more detail, the gain $G_{H_1}(k,l)$ can be calculated by the following equation 14 according to the optimally modified log-spectral amplitude (OM-LSA) speech estimation scheme proposed in the third thesis, and can also be calculated by the following equation 15 according to the MMSE speech estimation scheme proposed in the fourth and fifth theses.

$$G_{H_1}(k,l) = \frac{\xi(k,l)}{1+\xi(k,l)}\exp\left(\frac{1}{2}\int_{v(k,l)}^{\infty}\frac{e^{-t}}{t}dt\right) \quad \text{Equation 14}$$

$$G_{H_1}(k,l) = \frac{\sqrt{v(k,l)}}{\gamma(k,l)}\left[\Gamma\left(\frac{5}{4}\right)M\left(-\frac{1}{4};1;-v(k,l)\right)\right]^2 \quad \text{Equation 15}$$

In Equations 14 and 15, $\upsilon(k,l)$ is a function based on $\gamma(k,l)$ and $\xi(k,l)$, and can be represented by the following equation 16. $\Gamma(z)$ is a gamma function, and $M(a;c;x)$ is a confluent hypergeometric function.

Any of the OM-LSA method and the MMSE method can be freely used through the gain function unit 310*c*. In case of the OM-LSA scheme, the final gain G(k,l) can be calculated by Equation 17 using the speech presence probability p'(k,l) shown in Equation 9. In case of the MMSE scheme, the final gain G(k,l) can be calculated by Equation 18.

$$v(k,l) = \frac{\gamma(k,l)\xi(k,l)}{(\xi(k,l)+1)} \quad \text{Equation 16}$$

$$G(k,l) = \{G_{H_1}(k,l)\}^{p'(k,l)}G_{min}^{1-p'(k,l)} \quad \text{Equation 17}$$

$$G(k,l) = \left[p'(k,l)\sqrt{G_{H_1}(k,l)} + (1-p'(k,l))\sqrt{G_{min}}\right]^2 \quad \text{Equation 18}$$

As described above, the spectral gain computation unit 310 can calculate the final gain G(k,l) using a series of operations shown in FIG. 5.

The gain calculation process of the spectral gain computation unit 310 will hereinafter be described with reference to FIG. 6. The spectral gain computation unit 310 may receive the m-th separated signal $Y_m(k,l)$ obtained by the GSS algorithm of the signal processor 20, may receive total noise variance $\lambda_m(k,l)$ that is estimated by the noise estimation unit 300 and is mixed with the m-th separated signal, and may receive the speech presence probability p'(k,l) calculated by the noise estimation 300 in operation 3100. Upon receiving individual values, the spectral gain computation unit 310 may receive a signal corresponding to the square of a magnitude of the m-th separated signal $Y_m(k,l)$ from among various received values and the total noise variance $\lambda_m(k,l)$ as input signals, thereby estimating the posterior SNR $\gamma(k,l)$ using the posterior SNR estimation method in operation 3120.

After estimating the posterior SNR $\gamma(k,l)$, the spectral gain computation unit may estimate the prior SNR $\xi(k,l)$ on the basis of the posterior SNR $\gamma(k,l)$ and a conditional gain value $G_{H_1}(k,l)$ applied on the assumption that the speaker voice (speech signal) is present in the corresponding time-frequency bin in operation 3140. In this case, $G_{H_1}(k,l)$ may be calculated by Equation 14 according to the OM-LSA speech estimation method proposed in the third thesis, and may also be calculated by Equation 15 according to the MMSE speech estimation method proposed in the fourth and fifth theses.

After estimating the prior SNR $\xi(k,l)$, the spectral gain computation unit 310 may calculate the final gain value G(k,l) using any one of the OM-LSA method or the MMSE method on the basis of the estimated prior SNR $\xi(k,l)$ and the received speech presence probability p'(k,l) in operation 3160.

The final gain G(k,l) calculated through the above-mentioned operations may be multiplied by $Y_m(k,l)$ separated by the GSS algorithm applied to the gain application unit 320, such that a clear speech signal can be separated from a microphone signal in which other noise, peripheral noise and reverb are mixed.

As is apparent from the above description, the probability of speaker presence calculated when noise of a sound source signal separated by GSS is estimated may be used to calculate a gain without any change. It is not necessary to additionally calculate the probability of speaker presence when calculating the gain. The speaker's voice signal can be easily and quickly separated from peripheral noise and reverb and distortion is minimized. As such, if several interference sound sources, each of which has directivity, and a speaker are simultaneously present in a room with high reverb, a plurality of sound sources generated from several microphones can be separated from one another with low sound quality distortion, and the reverb can also be removed.

In accordance with another aspect, technology for isolating a sound source can be easily applied to electronic products such as TVs, computers, and microphones because a small number of calculations is used to separate each sound source, such that a user can conduct a video conference or video communication having higher sound quality while using public transportation (such as subway, bus, and trains) irrespective of noise levels.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for isolating a multi-channel sound source comprising:

a microphone array comprising a plurality of microphones;

a signal processor to perform Discrete Fourier Transform (DFT) upon signals received from the microphone array, convert the DFT result into a signal of a time-frequency bin, and independently separate the converted result into a signal corresponding to the number of sound sources using a Geometric Source Separation (GSS) algorithm; and a post-processor to estimate noise from a signal separated by the signal processor, calculate a gain value on the basis of the estimated noise and speech presence probability calculated when the noise is estimated at each time-frequency bin, and apply the calculated gain value to a signal separated by the signal processor, thereby separating a speech signal.

2. The apparatus according to claim 1, wherein the post-processor comprises:

a noise estimation unit to estimate interference leakage noise variance and stationary noise variance on the basis of the signal separated by the signal processor, and calculate the speech presence probability on the basis of the separated signal;

a gain calculator to receive a sum $\lambda_m(k,l)$ of the estimated interference leakage noise variance and the estimated stationary noise variance, receive the calculated speech presence probability p'(k,l) of the corresponding time-frequency bin, and calculate a gain value G(k,l) on the basis of the received values; and a gain application unit to multiply the calculated gain G(k, l) by the signal $Y_m(k,l)$ separated by the signal processor, and generate a speech signal from which noise is removed.

3. The apparatus according to claim 2, wherein the noise estimation unit calculates the interference leakage noise variance according to the equation $$\lambda_m^{leak}(k,l)=\eta\sum_{\substack{i-1\\i\neq m}}^{M}Z_i(k,l)$$

wherein $\eta$ is a constant, and $Z_m(k,l)$ is a value obtained when a square of a magnitude of the signal $Y_m(k,l)$ separated by the GSS algorithm is smoothed in a time bin according to the equation $$Z_m(k,l)=\alpha_s Z_m(k,l-1)+(1-\alpha_s)|Y_m(k,l)|^2$$

wherein $\alpha_s$ is a constant.

4. The apparatus according to claim 2, wherein the noise estimation unit determines whether a main component of each time-frequency bin is noise or a speech signal by applying a Minima Controlled Recursive Average (MCRA) method to the stationary noise variance, calculates the speech presence probability p'(k,l) at each bin according to the determined result, and estimates noise variance of the corresponding bin on the basis of the calculated speech presence probability p'(k,l).

5. The apparatus according to claim 4, wherein the noise estimation unit calculates the speech presence probability p'(k,l) according to the equation $$p'(k,l)=\alpha_p p'(k,l-1)+(1-\alpha_p)I(k,l)$$

wherein $\alpha_p$ is a smoothing parameter of 0 to 1, and I(k,l) is an indicator function indicating the presence or absence of a speech signal.

6. The apparatus according to claim 1, wherein the gain calculator calculates a posterior signal-to-noise ratio (SNR) $\gamma(k,l)$ using a sum $\lambda_m(k,l)$ of an estimated interference leakage noise variance and the estimated stationary noise variance, and calculates a prior SNR $\xi(k,l)$ on the basis of the calculated posterior SNR $\gamma(k,l)$.

7. The apparatus according to claim 6, wherein the posterior SNR $\gamma(k,l)$ is calculated according to the equation $$\gamma(k,l)=\frac{|Y_m(k,l)|^2}{\lambda_m(k,l)}$$

and the prior SNR $\xi(k,l)$ is calculated according to the equation $$\xi(k,l)=\alpha G_{H_1}{}^2(k,l-1)\gamma(k,l-1)+(1-\alpha)\max\{\gamma(k,l)-1,0\}$$

wherein $\alpha$ is a weight of 0 to 1, and $G_{H_1}(k,l)$ is a conditional gain on the assumption that a speech signal is present in the corresponding bin.

8. A method for isolating a multi-channel sound source comprising:

performing Discrete Fourier Transform (DFT) upon a plurality of signals received from a microphone array comprising a plurality of microphones;

independently separating, by a signal processor, each signal of the plurality of signals converted by the signal processor into another signal corresponding to the number of sound sources by a Geometric Source Separation (GSS) algorithm;

calculating, by a post-processor, a-speech presence probability so as to estimate noise on the basis of each signal separated by the signal processor;

estimating, by the post processor, noise according to the calculated speech presence probability; and calculating, by the post processor, a gain value on the basis of the estimated noise and the calculated speech presence probability at each of a plurality of time-frequency bins.

9. The method according to claim 8, wherein the noise estimating comprises estimating interference leakage noise variance and stationary noise variance on the basis of the signals separated by the signal processor.

10. The method according to claim 9, wherein noise estimating comprises calculating the sum of the calculated interference leakage noise variance and the stationary noise variance, and calculating the speech presence probability.

11. The method according to claim 9, wherein calculating the gain value comprises:

calculating a posterior SNR using a posterior SNR method that receives a square of a magnitude of the signal separated by the signal processor and the estimated sum noise variance as input signals;

calculating a prior SNR using a prior SNR method that receives the calculated posterior SNR as an input signal; and calculating the gain value on the basis of the calculated prior SNR and the calculated speech presence probability.

12. The method according to claim 11, further comprising:

multiplying the calculated gain value by the signal separated by the signal processor so as to separate a speech signal.

13. A non-transitory computer readable recording medium having embodied thereon a computer program for executing the method of any of claims 8 through 12.

14. An apparatus for isolating a multi-channel sound source comprising:

a microphone array comprising a plurality of microphones;

a signal processor to separate signals received from the microphone array into a signal corresponding to the number of sound sources; and a post-processor comprising:

a noise estimation unit to estimate interference leakage noise variance and stationary noise variance on the basis of the signal separated by the signal processor, and calculate speech presence probability on the basis of the separated signal;

a gain calculator to calculate the gain value on the basis of the estimated interference leakage noise variance, the estimated stationary noise variance and the calculated speech presence probability by the noise estimation unit, wherein the gain calculator calculates a posterior signal-to-noise ratio (SNR) using the sum of the interference leakage noise variance and the stationary noise variance, and calculates a prior SNR on the basis of the calculated posterior SNR; and a gain application unit to multiply the calculated gain value by the signal separated by the signal processor, and generate a speech signal from which noise is removed.

15. The apparatus of claim 14 wherein the signal processor performs Discrete Fourier Transform (DFT) upon the signals received from the microphone array, and converts the DFT result into a signal of a time-frequency bin.

16. The apparatus of claim 15 wherein the signal processor separates the converted result into a signal corresponding to the number of sound sources using a Geometric Source Separation (GSS) algorithm.

17. The apparatus according to claim 16, wherein the noise estimation unit calculates the interference leakage noise variance according to the equation $$\lambda_m^{leak}(k,l) = \eta \sum_{\substack{i-1 \\ i \neq m}}^{M} Z_i(k,l)$$

wherein $\eta$ is a constant, and $Z_m(k,l)$ is a value obtained when a square of a magnitude of the signal $Y_m(k,l)$ separated by the GSS algorithm is smoothed in a time bin according to the equation $$Z_m(k,l)=\alpha_s Z_m(k,l-1)+(1-\alpha_s)|Y_m(k,l)|^2$$

wherein $\alpha_s$ is a constant.

18. The apparatus according to claim 16, wherein the noise estimation unit determines whether a main component of each time-frequency bin is noise or a speech signal by applying a Minima Controlled Recursive Average (MCRA) method to the stationary noise variance, calculates speech presence probability p'(k,l) at each bin according to the determined result, and estimates noise variance of the corresponding bin on the basis of the calculated speech presence probability p'(k,l).

19. The apparatus according to claim 18, wherein the noise estimation unit calculates the speech presence probability p'(k,l) according to the equation $$p'(k,l)=\alpha_p p'(k,l-1)+(1-\alpha_p)I(k,l)$$

wherein $\alpha_p$ is a smoothing parameter of 0 to 1, and I(k,l) is an indicator function indicating the presence or absence of a speech signal.

20. The apparatus according to claim 14, wherein the posterior SNR $\gamma(k,l)$ is calculated according to the equation $$\gamma(k,l) = \frac{|Y_m(k,l)|^2}{\lambda_m(k,l)}$$

and the prior SNR $\xi(k,l)$ is calculated according to the equation $$\xi(k,l)=\alpha G_{H_1}^{\;2}(k,l-1)\gamma(k,l-1)+(1-\alpha)\max\{\gamma(k,l)-1,0\}$$

wherein $\alpha$ is a weight of 0 to 1, and $G_{H_1}(k,l)$ is a conditional gain on the assumption that a speech signal is present in the corresponding bin.

* * * * *

UNITED STATES PATENT AND TRADEMARK OFFICE

CERTIFICATE OF CORRECTION

PATENT NO. : 8,849,657 B2
APPLICATION NO. : 13/325417
DATED : September 30, 2014
INVENTOR(S) : Ki Hoon Shin It is certified that error appears in the above-identified patent and that said Letters Patent is hereby corrected as shown below:

In the Claims

Column 14, Line 42, In Claim 8, delete “a-speech” and insert -- speech --, therefor.

Signed and Sealed this
Twenty-third Day of December, 2014

Michelle K. Lee

Michelle K. Lee
*Deputy Director of the United States Patent and Trademark Office*